United States Patent Office 3,451,829
Patented June 24, 1969

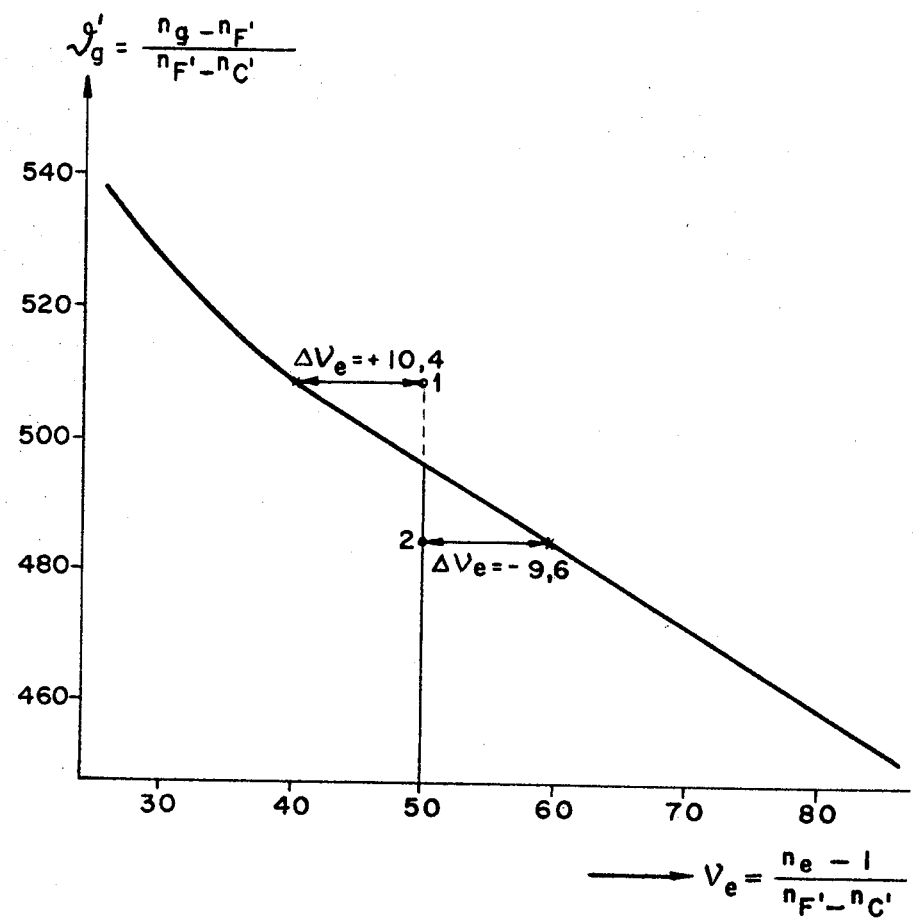

3,451,829
OPTICAL CROWN GLASSES
Heinz Bromer, Kreis Wetzlar, and Norbert Meinert, Wetzlar, Germany, assignors to Ernst Leitz, G.m.b.H., Wetzlar (Lahn), Germany
Filed Apr. 12, 1966, Ser. No. 542,035
Claims priority, application Germany, Apr. 29, 1965,
L 50,618
Int. Cl. C03c 3/30
U.S. Cl. 106—47      2 Claims

ABSTRACT OF THE DISCLOSURE

Optical crown glasses with anomalous partial dispersions are presented. Said glasses are prepared from mixes consisting of aluminum phosphates from 45–55% by weight, alkaline earth phosphates from 5–10% by by weight, alkali oxides from 10–20% by weight, alkaline earth oxides, Zn, Cd from 15–30% by weight and up to 10% by weight of $TiO_2$.

---

The subject matter of our invention are optical crown glasses with anomalous partial dispersions.

It has long been known that a correction of the secondary spectrum of objectives is possible only when at least one of the glasses used for this purpose exhibits an anomalous partial dispersion value $$\vartheta'g = \frac{n_g - n_F'}{n_F' - n_C'}$$

All so-called normal glasses exhibit a partial dispersion $\vartheta'g$ which over a wide range is in approximately linear dependence from the mean dispersion value Ve. This means that all of these glasses lie in a straight line in a diagram whose abscissa indicate the Ve value and whose ordinates indicates the $\vartheta'g$ value. This holds in each case for a $v_e$-value which is greater than 35.

With $v_e$-values which are smaller than 35, the $\vartheta'g$-value rises more steeply than would correspond to linearity. In the usual diagrams, in which the middle index of refraction $n_e$ is established on the ordinate, these glasses will be designated as "heavy flint." These heavy flint glasses posses accordingly a stronger dispersion in the blue region of the spectrum than other glasses. In other words, the $\vartheta'g$-values exhibit deviation to high values as compared to normal values so that these glasses are designated as $\vartheta g'$ (plus) glasses. Reversely, the glasses whose $\vartheta'g$-value is less than the normal glasses are designated as $\vartheta'g$ (minus) glasses. Physically this means that their dispersion in the blue region of the spectrum is smaller than that of the normal glasses.

If one compares, however, a glass with normal dispersion with a glass with anomalous partial dispersion, whose $\vartheta'g$-values are equal, they exhibit a variation in their mid dispersion value $v_e$. A $\vartheta'g$ (plus)-glass, according to another definition, has a higher $v_e$-value than the normal glass. The difference of the $v_e$-value is customarily designated $\Delta v_e$-value. According to the definition for the $\vartheta'g$ (plus) glasses the $\Delta v_e$-value will be positive, and given in units of the $v_e$-values for $\vartheta'g$(minus) glasses will be correspondingly negative.

In the accompanying drawing two glasses are designated schematically in a $\vartheta'g$-$v_e$-diagram. Therein according to the definition given above, glass 1 is indicated as $\vartheta'g$(plus) with a $\Delta v_e$-value of +10.4 and glass 2 is a $\vartheta'g$(minus)-glass with a $\Delta v_e$-value of −9.6.

It would now be found that one can obtain very stable crown glasses with positive deviation, $+\Delta v_e$, if one uses for glass formation meta- and orth-phosphates of aluminum as well as alkaline earth phosphates. The portion of phosphates of aluminum lies between 45% by weight and 55% by weight. The portion of alkaline earth phosphate amounts to from 5% by weight to 10% by weight. In order to obtain the highest possible $\Delta v_e$-value it is effective to add up to 10% by weight of titanium dioxide, $TiO_2$.

It is advantageous, to use alkali oxide together with the titanium dioxide in an amount from 10% by weight to 20% by weight of alkali oxides in order to obtain the clearest possible glasses. The alkali oxides serve moreover for the control of the middle indices of refraction $n_e$ of the glasses. For adjustment of specific optical values it is moreover advantageous to add oxides of Mg, Ca, Sr, Ba as well as Zn and Cd. The amount of these oxides should lie between 15% by weight and 30% by weight.

In known manner small amounts of decolorizers, for example, arsenic trioxide, may be added.

Examples of glass mixes according to the invention are given in the following tables.

In the section designated $\Delta v_e$ is given the deviation of the $v_e$ values from the curve for normal glasses in the $\vartheta'g$-$v_e$-diagram.

TABLE 1

| Composition: | Percent by weight |
| --- | --- |
| $Al(PO_3)_3$ | 39.0 |
| $Ca(PO_3)_2$ | 7.1 |
| $AlPO_4$ | 14.0 |
| $K_2O$ | 15.5 |
| $CaO$ | 4.0 |
| $BaO$ | 9.4 |
| $ZnO$ | 7.7 |
| $TiO_2$ | 3.3 |

A well mixed charge of about 3.5 kg. is introduced in successive portions into a platinum crucible, finally held for 120 minutes at 1350° C., then stirred to a temperature of 1050° C. and, without stirring, permitted to decrease in temperature to 950° C. and then cast in carbon molds.

The values are:

$$n_e = 1.5600$$
$$V_e = 52.63$$
$$\vartheta'g = 0.5038$$
$$\Delta V_e = +7.9$$

The given optical data are measured values of a completely annealed glass.

| Melt No. | $Ca(PO_3)_2$ | $Al(PO_3)_3$ | $AlPO_4$ | $K_2O$ | $CaO$ | $BaO$ | $ZnO$ | $TiO_2$ | $Na_2O$ | $n_e$ | $V_e$ | $\vartheta g(\times 10^{-4})$ | $\Delta v$ |
| --- | --- | --- | --- | --- | --- | --- | --- | --- | --- | --- | --- | --- | --- |
| 1 | 7.1 | 49.0 | | 13.0 | 3.4 | 9.3 | 13.4 | 2.8 | 2.0 | 1.5690 | 51.8 | 5041 | +7.4 |
| 2 | 7.1 | 49.0 | 2.0 | 14.7 | 3.4 | 9.3 | 11.7 | 2.8 | | 1.5642 | 51.9 | 5014 | +5.6 |
| 3 | 7.1 | 44.0 | 5.0 | 16.7 | 3.4 | 9.3 | 11.7 | 2.8 | | 1.5613 | 52.7 | 5028 | +7.3 |
| 4 | 7.1 | 39.0 | 10.0 | 16.7 | 3.4 | 9.3 | 11.7 | 2.8 | | 1.5608 | 53.8 | 4995 | +6.1 |
| 5 | 7.1 | 39.0 | 14.0 | 16.0 | 3.4 | 9.3 | 7.7 | 3.5 | | 1.5571 | 52.3 | 5038 | +7.6 |
| 6 | 7.1 | 39.0 | 14.0 | 15.5 | 4.0 | 9.4 | 7.7 | 3.3 | | 1.5600 | 52.63 | 5038 | +7.9 |

Having described our invention, we claim:
1. Optical crown glass with anomalous partial dispersion $$\vartheta'g = \frac{n_g - n_F}{n_F' - n_C'}$$

characterized in that it is prepared from a mix which consists of aluminum phosphates from 45 to 55 percent by weight, of which up to about 14% may be $AlPO_4$ and the balance $Al(PO_3)_3$, alkaline earth phosphates from 5 to 10 percent by weight as glass formers, alkali oxides from 10 to 20 percent by weight and oxides of Mg, Ca, Sr, Ba, Zn, Cd from 15 to 30 percent by weight.

2. Optical crown glass according to claim 1 characterized in that it contains up to 10 percent by weight $TiO_2$.

References Cited

UNITED STATES PATENTS

| | | | |
|---|---|---|---|
| 2,359,789 | 10/1944 | Pimcus | 106—52 X |
| 3,020,238 | 2/1962 | Mumakata et al. | 106—47 |
| 3,328,181 | 6/1967 | Weidel | 106—47 |
| 3,253,934 | 5/1966 | Godrom | 106—47 |

TOBIAS E. LEVOW, *Primary Examiner.*

J. COOPER, *Assistant Examiner.*

U.S. Cl. X.R.

252—300